June 20, 1933. C. L. COOK 1,914,992
AGRICULTURAL IMPLEMENT
Filed March 22, 1930  2 Sheets-Sheet 1
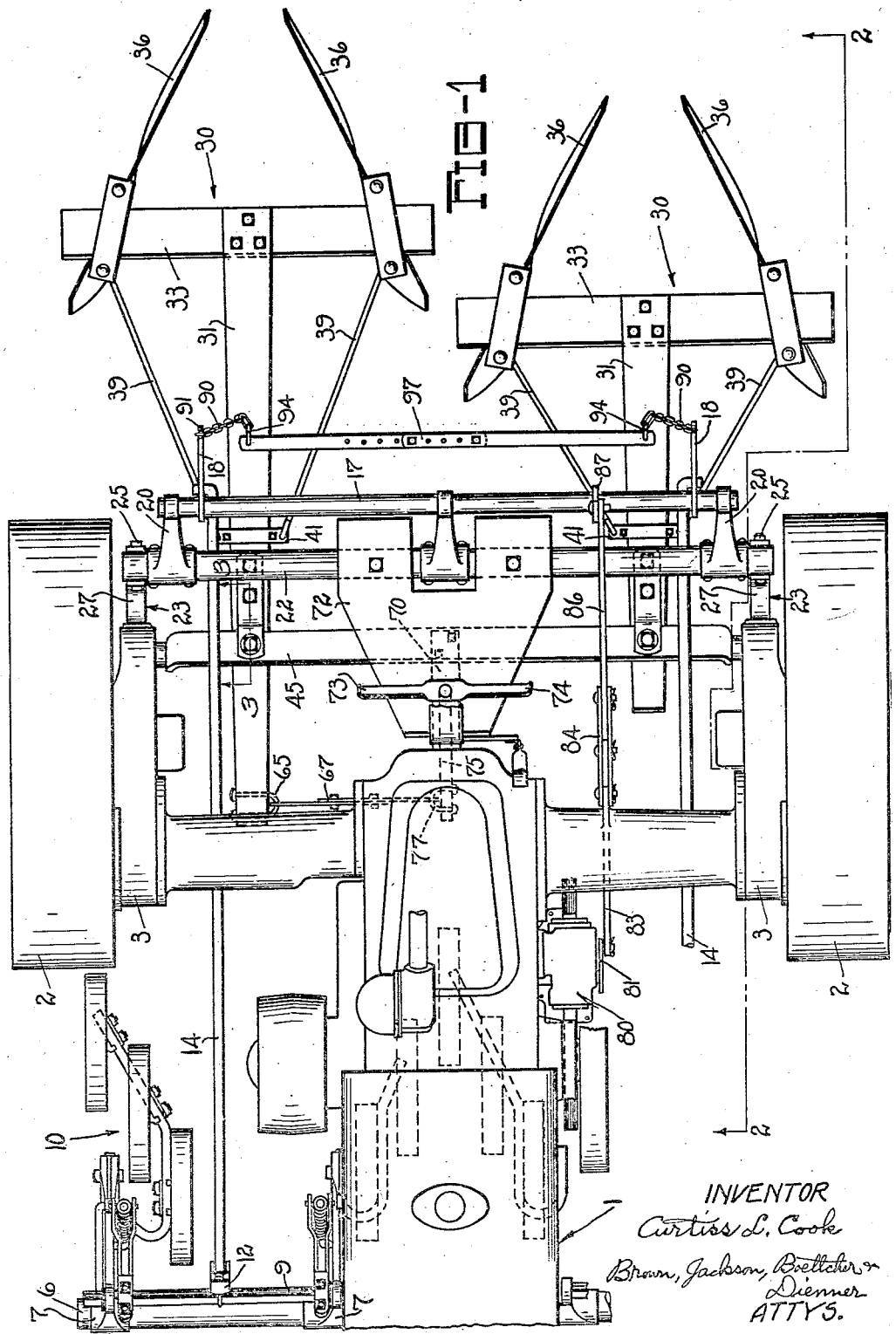
INVENTOR
Curtiss L. Cook
Brown, Jackson, Boettcher &
Dienner
ATTYS.

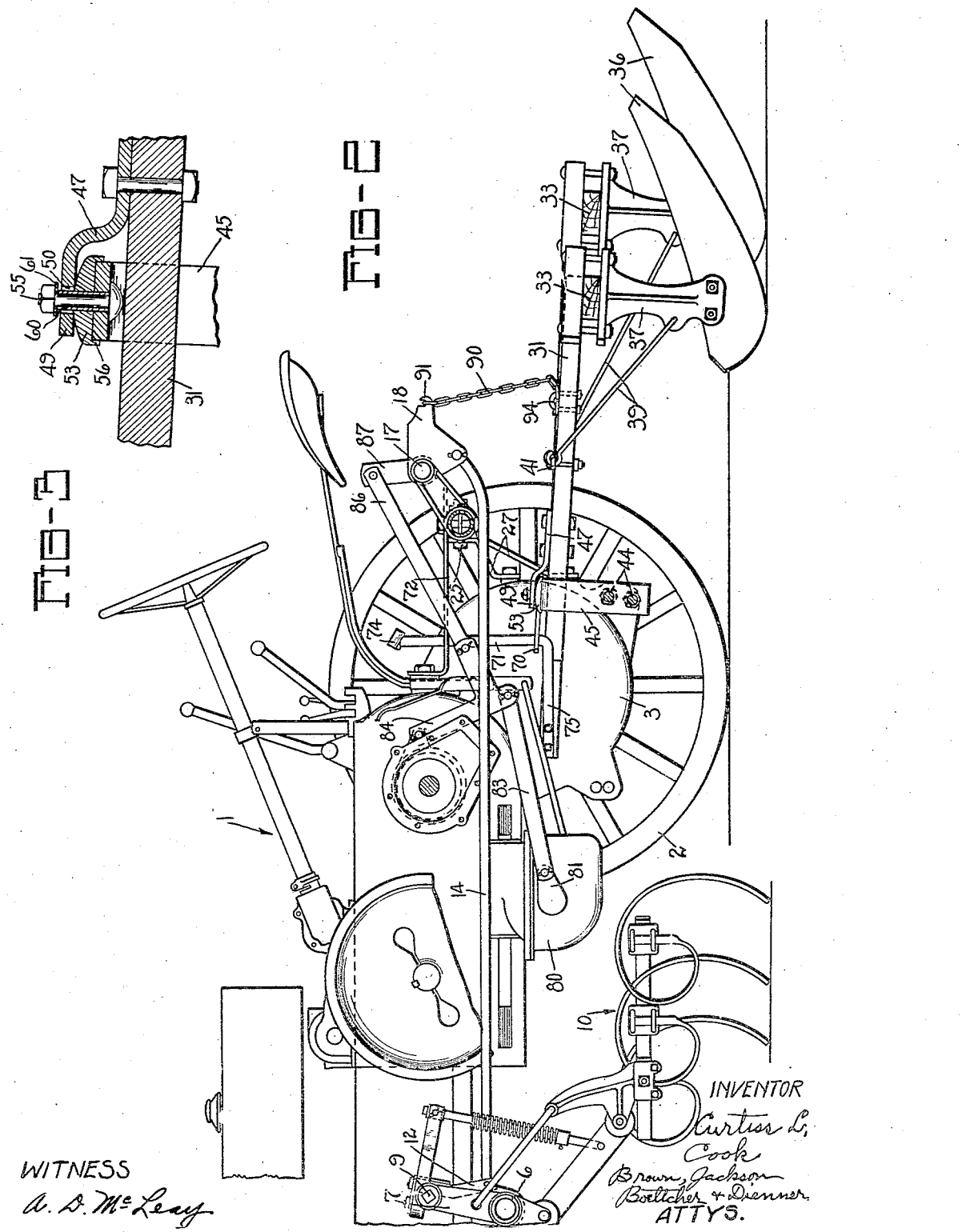

Patented June 20, 1933

1,914,992

UNITED STATES PATENT OFFICE

CURTISS L. COOK, OF SYRACUSE, NEW YORK, ASSIGNOR TO SYRACUSE CHILLED PLOW COMPANY, INC., OF SYRACUSE, NEW YORK, A CORPORATION OF NEW YORK

AGRICULTURAL IMPLEMENT

Application filed March 22, 1930. Serial No. 438,013.

My invention relates to agricultural implements of the type designed for use in cultivating row crops, particularly those wherein the cultivating or ground working tools are mounted on or propelled by a motor driven tractor whose wheels are so spaced as to straddle the rows of plants and wherein the cultivating tools must also straddle the plant rows in order to prevent injury to the growing crop.

My invention particularly relates to cultivating implements especially adapted for working potato crops. In the cultivation of growing crops of potatoes it has heretofore been necessary, so far as I am aware, to go over the ground first with a cultivator to loosen up the ground, and then go over the ground again with cultivating tools, such as potato hoes, to hill up the plants.

My invention is particularly concerned with, in the embodiment illustrated, mounting both sets of cultivating tools, that is, the ground cultivating tools and the potato hoes or plant hilling tools, on a tractor of the wide tread type. I propose to so mount both sets of ground working devices on the tractor that they are simultaneously operated and controlled so that the two operations mentioned above can be performed at one and the same time, thus effecting a considerable saving in the cost of producing a crop. In the embodiment illustrated I have shown a two-row implement, but it is to be understood that my invention is applicable as well to implements capable of working more than two rows at one time.

One important feature of my invention is the mounting of the rear set of cultivating tools, that is, the potato hoes or plant hilling devices, on the tractor so as to be horizontally movable, not only for the purpose of adjusting the tools to the particular spacing of the rows, but also for the purpose of allowing the rear tools to follow the rows more or less automatically. I also propose to augment this automatic functioning of the rear tools in following the plant rows by manually operable means by which the operator may offset any tendency toward lateral displacement when the implement is working on a hillside.

It will be recognized that when operating on the side of a hill the rear end of the tractor tends to skid downwardly, which skidding tendency is counteracted by keeping the steering wheel of the tractor turned slightly up hill. As a result, the tractor is made to follow the row but in a slightly diagonal position with respect thereto. Any tools carried at the rear of a tractor under such conditions would also be diagonal with respect to the rows and due to their position behind the tractor there is considerable likelihood, in devices of the prior art, of tearing out or injuring the plants. My invention contemplates mounting the rear tools in such a manner that such downward skidding or displacement may be effectively counteracted by manually operable means to move the rear tools to correct position.

Other objects and advantages of my invention will be apparent to those skilled in the art after a consideration of the following detailed description of one embodiment thereof, taken in conjunction with the accompanying drawings, in which:—

Figure 1 is a top plan view showing the tractor and the mounting for both sets of tools and the operative connections therebetween;

Figure 2 is a vertical sectional view taken substantially on the line 2—2 of Figure 1 and showing some parts in section and others in elevation; and Figure 3 is an enlarged detail view, taken on the line 3—3 of Figure 1, of the mounting of the beams of the rear tools on the tractor.

The reference numeral 1 indicates generally the tractor having drive wheels 2 supported in operative relation to drive chain housings 3. Near the forward end of the tractor there is carried a frame pipe 6 supporting a plurality of brackets or hangers 7 which serve to rotatably support the front lifting bar 9. Front cultivating tools 10 are carried by each of the hangers 7 and are operatively connected to the lifting bar 9 as shown in Figure 2.

At each side of the tractor the front lifting shaft is provided with an arm 12 secured thereto, as by bolts, and extending rearwardly from the arms 12 is a pair of links 14 which operatively connect the front lifting shaft 9 with a rear lifting shaft 17, each of the links 14 being connected to the shaft 17 by means of a plate or bracket 18, as shown in Figure 2.

The rear lifting shaft 17 is journaled in the outer ends of arms 20 riveted or otherwise secured to the rear frame pipe 22 which is supported from the two chain housings 3 by means of brackets 23. The rear frame pipe 22 may be bolted to the brackets 23 as by bolts 25, and each of the brackets 23 consists of two straps 27, as indicated in Figure 2.

In the embodiment of my invention illustrated, the rear cultivating tools or hilling devices are in the form of hoe sections 30, and each section comprises a longitudinal beam 31 to which is bolted a cross-beam 33. From the under side of the cross-beams 33 ground working tools in the form of hoes 36 are suspended, as by standards 37 reinforced against rearward movement by forwardly extending tie rods 39. At their forward ends the tie rods 39 are connected to clips 41 secured to the longitudinal beams 31.

Rigidly secured to each of the drive chain housings 3, as by bolts 44, is a transverse U-shaped supporting member 45. Near their forward ends the longitudinal beams 31 are pivotally supported from the U-shaped member 45. Referring more particularly to Figures 2 and 3, it will be observed that the means provided for so pivotally supporting the beams 31 from the U-shaped member 45 comprises a supporting strap 47 bolted to each of the beams 31 and each strap member 47 has an upwardly and forwardly extending portion 49 with an aperture 50 therein.

The end 49 of the supporting strap member 47 is adapted to overlie and be carried by a beveled bearing plate 53 secured on the upper side of the U-shaped supporting member 45, as shown in Figures 2 and 3. The plate 53 is maintained in position on the supporting member 45 by a bolt 55 passing through apertures formed in the supporting member 45 and the plate 53, and the latter may be formed with down-turned flanges 56 to embrace the sides of the supporting member 45 as shown in Figure 3.

Surrounding the bolt 55 is a sleeve 60, the upper end of which is engaged by a washer 61, and as will be noted from Figure 3, the sleeve 60 is substantially smaller than the aperture 50 formed in the end portion 49 of the strap 47, which aperture is, however, smaller than the washer 61 so that while the supporting strap member 47 cannot become disengaged from the bolt 55 it is capable of some lateral shifting relative thereto so that not only may the beams 31 swing in a horizontal plane but they also may swing a limited amount in a vertical plane for a purpose to be described later.

As shown in Figure 1, the right-hand beam 31 extends forward a distance greater than the left-hand beam 31 and at its forwardmost end the right-hand beam 31 is provided with a U-bolt 65 to which is connected the two parts of an adjustable link 67. Extending forwardly from the central portion of the supporting member 45 is a bracket 70 rigidly secured thereto and forming a part thereof and which is provided with an aperture to receive the lower end of a vertical spindle 71. The upper end of the spindle 71 is journaled in the platform 72 which is bolted to the rear frame pipe 22 and to the gear housing of the tractor. At the upper end of the spindle 71 foot levers 73 and 74 are provided, and at the lower end of the spindle 71 there is a forwardly projecting arm 75 carrying the U-bolt 77 to which is connected the other end of the adjustable link means 67.

The tractor 1 is provided with the usual power lift mechanism, indicated generally by the reference numeral 80, which has the operating crank 81 connected by means of a link 83 to a fore and aft swinging arm 84. The arm 84 is connected by a link 86 to an arm 87 fixed to the rear lifting shaft 17 which also carries the plates or brackets 18 rigidly therewith, as described above. Chains 90 connect the hooks 91 of the brackets 18 with U-bolts 94 carried by the longitudinal extending beams 31. A pair of adjustable links 97 serve as means for connecting one of the beams 31 with the other to maintain them properly spaced in adjusted position, depending upon the width of the rows, and the outer ends of each of the links 97 are connected with the U-bolts 94, as indicated in Figure 1.

In the operation of my device, the forward tools 10 at the front end of the tractor loosen the soil between the rows of plants after which the two pairs of hoe elements crowd the loosened soil up around the plants. On level ground the hoe sections at the rear of the tractor follow the rows more or less automatically so that little or no steering by means of the foot pedals 73 and 74 is necessary. When, however, the implement is being used on a hillside and the tractor takes a slightly diagonal position, as pointed out above, the operator maintains a pressure on the proper foot pedal 73 or 74 so as to swing the rear end of the beams 31 carrying the hoes 36 slightly in the uphill direction. For example, if the tractor skids downwardly towards the right the operator must exert a pressure on the foot pedal 74 thus causing the front end of the beams 31 to be steered in the direction of the skid while causing the hoes 36 to be swung in the opposite direction, so as to thereby maintain them in their proper relation to the plant rows. It is to be understood that normally the operator is not called upon to cause any appreciable movement of the hoes 36 with respect to the ground, but merely exerts a pressure sufficient to cause the hoes to maintain their straddle position with respect to the plant rows.

When the implement approaches the end of the rows, all that is necessary to lift both the forward and the rear tools 10 and 36 from their ground working position is to trip the power lift 80 in the usual manner. The lifting crank 81 will then be actuated to pull forwardly on the links 83 and 86 thus rocking the rear lifting shaft 17 in a counter-clockwise direction as viewed in Figure 2, which in turn will lift the brackets 18 and, through chains 90, the beams 31. At the same time a rearward pull is exerted on the links 14 which rocks the front lifting bar 9 whereby the front tools 10 are lifted simultaneously with the rear tools 36.

While I have described, in connection with the accompanying drawings, the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:—

1. In combination, a tractor including a power lift operated by said tractor, cultivator units mounted on the tractor, a plurality of potato hoes mounted on the tractor for both horizontal and vertical pivotal movement and rearwardly of said cultivator units, and means connecting said hoes and said units to said power lift for simultaneous actuation thereby.

2. In combination, a tractor including a power lift operated by said tractor, cultivator units mounted on the tractor, a plurality of potato hoes pivotally mounted for horizontal and vertical pivotal movement on the tractor rearwardly of and in a longitudinal plane with said cultivator units, means connecting said hoes and said power lift whereby the hoes may be raised to transport position, and means connecting the hoes with said cultivator units for simultaneous operation whereby said hoes are positioned to operate upon the soil operated upon by the cultivator units.

3. In combination, a tractor including a power lift operated by said tractor, a pair of transverse lifting shafts, a plurality of cultivator rigs connected with one of said shafts, a plurality of hoe units pivotally mounted for horizontal and vertical pivotal movement on the tractor adjacent the other of said shafts and being substantially in longitudinal alinement with the cultivator rigs with respect to the tractor, connecting means between said units and said other shaft, a link connecting said shafts for simultaneous operation, and link means operatively connecting the power lift to the other of said shafts.

4. In combination, a tractor having a power lift driven therefrom and a frame including rear wheel drive housings, a pair of parallel transverse lifting shafts, brackets secured to said frame and pivotally carrying one of said shafts, bracket supporting means mounted on said housings and pivotally supporting the other of said shafts, arms respectively secured to said shaft, a link connecting said arms, a plurality of cultivator rigs connected with one of said shafts, a plurality of hoe units pivotally mounted to swing horizontally on the tractor adjacent the other of said shafts, connecting means between said units and said other shaft, and link means operatively connecting the power lift to the other of said shafts.

5. In combination, a tractor having a power lift, cultivator units pivotally mounted on the tractor, a plurality of earth working tools pivotally mounted on the tractor for both horizontal pivotal and vertical pivotal movement, means connecting said tools and said units to the power lift for simultaneous operation thereby, and means on the tractor and connected with the tools to move the latter horizontally to steer the same.

6. In combination, a tractor having a power lift, cultivator units pivotally mounted on the tractor, a plurality of earth working tools mounted on the tractor for both horizontal and vertical movement and rearwardly of said units, means to maintain said tools in parallel relation, means connecting said tools and said units to the power lift for simultaneous operation thereby, and means on the tractor and connected with the tools to move the latter horizontally to steer the same, each of said tools being substantially in longitudinal alinement with a cultivator unit whereby each tool is positioned to operate upon the soil operated upon by said unit.

7. In combination, a tractor having a frame and a power lift device, a plurality of cultivator units pivotally mounted on said frame, a plurality of earth working tools mounted on the frame for both horizontal and vertical pivotal movement, means connecting said tools and said units to the power lift for simultaneous operation thereby, and means on the tractor and connected with the tools to move the latter horizontally to steer the same, said means comprising a foot operated means having an upright bearing in said frame and link connected to said tools.

8. In combination, a tractor having a frame and a power lift device, a plurality of cultivator units pivotally mounted on said frame, a plurality of earth working tools mounted on the frame for both horizontal and vertical pivotal movement, means connecting said tools and said units to the power lift for simultaneous operation thereby, means on the tractor and connected with the tools to move the latter horizontally to steer the same, and means to maintain said tools in proper spaced relation.

9. In combination, a tractor having a frame and a power lift device, a plurality of cultivator units pivotally mounted on said frame, a plurality of earth working tools mounted on the frame for both horizontal and vertical pivotal movement, means connecting said tools and said units to the power lift for simultaneous operation thereby, means on the tractor and connected with the tools to move the latter horizontally to steer the same, and means to maintain said tools in proper spaced relation, said last named means including a pair of links adjustably secured together.

10. An agricultural implement of the class described comprising, in combination, a tractor having a power lift, a transverse supporting member mounted on the tractor, a plurality of potato hoes pivoted to the supporting member for both horizontal and vertical movement, and means to effect said horizontal and vertical movement.

11. An agricultural implement of the class described comprising, in combination, a tractor having a power lift, a transverse supporting member mounted on the tractor, a plurality of potato hoes pivoted to the supporting member for both horizontal and vertical movement, means connecting the hoes to said power lift to effect vertical movement of the hoes and means on the tractor to effect horizontal movement of the hoes.

12. An agricultural implement of the class described comprising, in combination, a tractor having a power lift, a transverse supporting member mounted on the tractor, a plurality of earth working tools including forwardly extending beams, means pivotally connecting the beams to the tractor for universal movement relative thereto, means connecting the tools to said power lift to effect an upward movement of said tools and means on the tractor optionally operable to effect transverse movement of said tools.

13. An agricultural implement of the class described comprising, in combination, a tractor having a power lift, a transverse supporting member mounted on the tractor, a plurality of earth working tools including forwardly extending beams, means pivotally connecting the beams to the tractor for universal movement relative thereto, means connecting the tools to said power lift to effect an upward movement of said tools and means on the tractor optionally operable to effect transverse movement of said tools, said last mentioned means including a foot operated member journaled for movement about a vertical axis and adjustable link means connecting the said member to the earth working tools.

14. An implement of the character described comprising, in combination, a tractor having a power lift, a supporting member secured to the frame of the tractor, a plurality of earth working tools having forwardly extending beams, means pivoting said beams to the supporting member for universal movement relative thereto, said beams being supported intermediate the ends thereof, a platform secured to the frame of the tractor, a vertical steering lever journaled on the frame and platform and having an arm extending longitudinally of the tractor, a link connecting the arm to the beams to swing the latter and position the same relative to the tractor, and means connecting the beams with the power lift of the tractor.

15. An implement of the class described comprising, in combination, a tractor having an upwardly arched supporting member, a plurality of earth working tools having fore and aft extending beams, means pivotally supporting said beams at a point between the ends thereof on said member, and steering means for the beams comprising a manually operable lever, a spindle connected thereto, and link means connecting the spindle to the beams.

16. An implement of the class described comprising, in combination, a tractor having a transverse U-shaped member rigidly secured thereto, a plurality of earth working tools having fore and aft extending beams, means pivotally supporting said beams at a point between the ends thereof on said member for lateral swinging, and steering means for positioning said tools relative to the tractor comprising manually operable means having a substantially vertical spindle journaled on the tractor and on said transverse member, a forward extending arm on the spindle, and link means connecting the outer end of the arm with the beams to swing the same.

17. An agricultural implement of the class described comprising, in combination, a plurality of earth working tools having fore and aft extending beams, means pivotally supporting said beams at a point between the ends thereof, said means comprising a wheeled frame and a supporting member secured thereto, and steering means for the beams comprising a manually operable lever, a spindle connected thereto, and link means connecting the spindle to the beams.

18. In an implement for cultivating potatoes or the like, a supporting frame including a transverse member, a plurality of longitudinally extending beams having earth working tools secured thereto, means pivoting the beams near one end on said transverse member for movement in a horizontal plane, foot pedals journaled to said supporting frame, and means connecting the other end of one of the beams to the foot pedals.

19. In an implement for cultivating potatoes or the like, a supporting frame including a transverse member having means providing a plurality of vertical pivots, a plurality of longitudinally extending beams having earth working tools and means supporting the beams from the vertical pivots of the transverse member, said means pivoting the beams near one end on said transverse member for movement in a horizontal plane, foot pedals journaled to said supporting frame, and means connecting the other end of one of the beams to the foot pedals.

20. In an implement for cultivating potatoes or the like, a supporting frame including a transverse member, a bearing plate secured to the transverse member, a longitudinally extending beam having an earth working tool and suspended from said bearing plate for horizontal movement, means for so suspending the beam, and mechanism for effecting said horizontal movement.

21. In a cultivating implement of the class described, a supporting frame including a transverse U-shaped member having a beveled bearing plate, a beam having ground working tool at one end and a supporting member near the other end, means loosely pivoting the supporting member on said bearing plate whereby the beam may be swung horizontally and vertically, said pivoting means including a bearing sleeve received by the supporting member, and mechanism connected with said other end of the beam for effecting relative horizontal movement.

22. In a cultivating implement of the class described, a supporting frame including a transverse U-shaped member having a beveled bearing plate, a beam having ground working tool at one end and a strap secured thereto, said strap having one end extended and adapted to support the beam from said bearing plate, apertures in said plate and said end of the strap, a securing bolt having a bearing sleeve received within said aperture whereby the beam is mounted on said transverse member for lateral swinging, foot pedals, and connections between the foot pedals and said beam whereby to swing the latter.

23. In a cultivating implement of the class described, a supporting frame including a transverse U-shaped member having a beveled bearing plate, a beam having a ground working tool at one end and a strap secured thereto, said strap having one end extended and adapted to support the beam from said bearing plate, apertures in said plate and said end of the strap, a securing bolt having a bearing sleeve received within said aperture, the aperture in the strap being larger than the sleeve whereby the beam can swing both horizontally and vertically while being supported by the strap on said bearing plate, foot pedals mounted on the supporting frame, connections between the foot pedals and the beam for swinging the same horizontally, and means on the supporting frame for swinging the beam vertically.

24. In a cultivating implement of the class described, a supporting frame including a transverse member, a plurality of longitudinally extending beams each having a ground working tool near one end, means near the other end for supporting the beams on the frame for horizontal swinging, one of said beams being longer than the others, means for effecting horizontal movement of the beams including a connecting link secured to the long end of said beams and connecting means between the said beam and the other beams.

25. In a cultivating implement of the class described, a supporting frame including a transverse member, a pair of longitudinally extending beams having ground working tools near one end, means near the other end for supporting the beams on the frame for horizontal swinging, one of said beams being longer than the other, means for effecting horizontal movement of the beams including a connecting link secured to the long end of the one beam and a connecting link extending between the pair of beams, both of said links being adjustable.

26. In a cultivating implement of the class described, a supporting frame including a transverse member, a pair of longitudinally extending beams having ground working tools near one end, means near the other end for supporting the beams on the frame for horizontal swinging, one of said beams being longer than the other, means for effecting horizontal movement of the beams relative to the frame, comprising foot pedals, a substantially vertical spindle journaled in said frame and having a forwardly extending arm, a link connecting the forward end of the arm with the long end of said one beam, and spacing means connecting the beams to space the same and to effect the simultaneous movement thereof, said link and means being adjustable.

27. In a row cultivator of the class described and adapted for side hill operation, the combination of a wheeled frame, a transverse member secured thereto, a plurality of beams carrying earth working tools pivoted to the transverse member for relative horizontal movement, and manually operated means to maintain the tools in row straddling position, said means comprising a foot operated spindle journaled on the frame and having an arm, a link connecting the arm and one of the beams, means connecting said one beam with the others, whereby the operator may keep the tools in proper position relative to the rows, regardless of the angular position of the wheeled frame.

28. In combination, a tractor, cultivator units mounted at the front of the tractor, each unit comprising a pair of shovels positioned to cultivate a strip of soil on each side of a plant row, secondary ground working implements mounted at the rear of the tractor to swing horizontally with respect thereto, each implement comprising a pair of ground working tools, the tools of the secondary implements being positioned in longitudinal planes with the respective shovels of the cultivator units whereby the tools of the implements operate upon the same strips of soil operated upon by the shovels of the cultivator units, and means for raising the cultivator units and implement units to transport position.

29. In combination, a tractor, cultivator tools mounted at the front and rear of the tractor, the front tools comprising units of a plurality of tools each, the rear tools being supported for horizontal swinging movement and positioned to operate substantially upon the same soil operated upon by a front unit of tools, and means for raising the tools to transport position.

30. In combination, a tractor, cultivator tools mounted at the front and rear of the tractor, the front tools comprising units of at least one tool each, each rear tool being positioned to operate substantially upon the same soil operated upon by a front unit of tools, means for simultaneously raising all of the tools to transport position, and means on the tractor and connected with the rear tools to move said rear tools horizontally to steer the same.

31. In combination, a tractor, cultivator tools mounted at the front and rear of the tractor, the front tools comprising units each having a plurality of tools, each rear tool being positioned to operate substantially upon the same soil operated upon by a front unit of tools, means for raising all of the tools simultaneously to transport position, means to maintain the rear tools in spaced relation, and means on the tractor and connected with the rear tools to move said rear tools horizontally to steer the same.

32. In combination, a tractor, cultivator tools mounted at the front of the tractor in units of a plurality of tools each and adapted to cultivate a strip of soil, potato hoes mounted at the rear of the tractor for free horizontal swinging movement relative thereto, each of said hoes being in substantial alinement with a unit of front tools longitudinally of the tractor and adapted to automatically follow and operate substantially on the same strip of soil operated upon by said front unit of tools, and means for raising the front cultivator units and the rear tools into transport position.

33. In combination, a tractor, cultivator tools mounted at the front of the tractor in units of two each and adapted to cultivate a strip of soil, potato hoes mounted at the rear of the tractor, each of said hoes being in substantial alinement with a unit of front tools longitudinally of the tractor so as to operate substantially on the same strip of soil operated upon by said front unit of tools, means for simultaneously raising the front cultivator units and the rear tools into transport position, and means on the tractor and connected with the rear tools to move said rear tools horizontally to steer the same.

34. In combination, a tractor, cultivator tools mounted at the front of the tractor in units of two each and adapted to cultivate a strip of soil, potato hoes mounted at the rear of the tractor, each of said hoes being in substantial alinement with a unit of front tools longitudinally of the tractor so as to operate substantially on the same strip of soil operated upon by said front unit of tools, means for raising the front cultivator units and the rear tools into transport position, means on the tractor connected with the rear tools to move said rear tools horizontally to steer the same, and means to maintain the rear tools in spaced relation.

35. An agricultural implement of the class described comprising, in combination, a tractor, a transverse supporting member mounted on the rear of the tractor, a plurality of cultivator units mounted at the front of the tractor, each of said units comprising a plurality of cultivator tools, a plurality of potato hoes including forwardly extending beams, means pivotally connecting the beams to the transverse supporting member for universal movement relative thereto, whereby each of said hoes is in substantial alinement with a unit of front cultivator tools longitudinally of the tractor so that each hoe operates substantially on the same strip of soil operated upon by said front unit of tools, means mounted on the tractor for effecting simultaneous raising of said front units of cultivator tools and said rear hoes, and means on the tractor optionally operable to effect transverse movement of said hoes.

36. In combination, an agricultural implement, earth working tools for said implement, vertically swingable supporting means connected with said implement for free lateral movement relative thereto and for supporting said earth working tools, and manually operated means supported in fixed relation upon said implement and connected with said vertically swingable supporting means to optionally control the lateral movement thereof.

37. In combination, an agricultural implement, cultivator tools carried by said implement for cultivating a strip of soil, hoes associated with said implement and disposed rearwardly of said cultivator tools and adapted to hill up substantially the same strip of soil, means for supporting said hoes for free lateral swinging movement whereby said hoes automatically follow said strip of soil, and control means on said implement and connected with said hoe supporting means for definitely controlling the position of said hoes under certain conditions.

38. In combination, a tractor including tractor steering means, cultivator units pivotally mounted on the tractor, a plurality of earth working tools pivotally mounted on the tractor for both horizontal pivotal and vertical pivotal movement, and separate steering means on the tractor and connected with said tools to move the latter horizontally to steer the same independently of the tractor steering means.

39. In combination, an agricultural implement, earth working tools for said implement, vertically movable supporting means connected with said implement for free lateral movement relative thereto and for supporting said earth working tools, operable means supported in fixed relation upon said implement, and link means connected between said operable means and said vertically movable supporting means to optionally control the lateral movement of the latter.

40. In combination, an agricultural implement, earth working tools for said implement, vertically movable supporting means connected with said implement for free lateral movement relative thereto and for supporting said earth working tools, operable means supported in fixed relation upon said implement, and a pivoted link extending substantially transversely between said operable means and said vertically movable supporting means to optionally control the lateral movement of said supporting means.

41. In combination, an agricultural implement, earth working tools for said implement, vertically movable supporting means connected with said implement for free lateral movement relative thereto and for supporting said earth working tools, operable means supported in fixed relation upon said implement, and means connecting said operable means and said supporting means and providing for relative vertical movement therebetween while transmitting lateral movement to said supporting means to optionally steer the latter.

42. In combination, an agricultural implement, earth working tools for said implement, vertically movable supporting means connected with said implement for free lateral movement relative thereto and for supporting said earth working tools, operable means supported in fixed relation upon said implement, and connecting means connected between said operable means and said supporting means to optionally steer the supporting means relative to said implement, said connecting means having one end portion thereof vertically shiftable with respect to the other end portion thereof.

43. In combination, an agricultural implement, earth working tools for said implement, vertically movable supporting means connected with said implement for free lateral movement relative thereto and for supporting said earth working tools, operable means supported in fixed relation upon said implement and adapted for optionally steering said supporting means relative to the movements of said implement and comprising pivotal means pivoted on said implement for movement upon a substantially vertical axis disposed in fixed relation with respect to said implement, said pivotal means extending longitudinally of the implement, and pivoted link means connected between said pivotal means and said supporting means.

44. In combination, an agricultural implement, earth working tools for said implement, vertically movable supporting means connected with said implement for free lateral movement relative thereto about a fixed pivotal axis on said implement and for supporting said earth working tools, said supporting means having a swingable extension thereon projecting forwardly of the pivotal point on said implement for said supporting means, and operable means for optionally steering said supporting means relative to said implement comprising a pivoted member rotatable about a substantially vertical axis fixed with respect to said implement and extending forwardly thereof, and pivoted link means extending substantially transversely of said implement and connecting said pivoted member with said supporting means.

45. In combination, an agricultural implement, earth working tools for said implement, vertically swingable supporting means connected with said implement for free lateral movement relative thereto and for supporting said earth working tools, power operated means for raising said supporting means, and manually operated means for optionally controlling the lateral movement of said supporting means to steer the latter relative to said implement.

46. In combination, an agricultural implement, earth working tools for said implement, vertically swingable supporting means connected with said implement for free lateral movement relative thereto and for supporting said earth working tools, power operated means for raising said supporting means, and operable means mounted in fixed relation to said implement and connected with said supporting means to optionally control the lateral movement of said supporting means to steer the same relative to said implement.

In witness whereof, I hereunto subscribe my name this 17 day of March, 1930.

CURTISS L. COOK.